(12) United States Patent
Forde

(10) Patent No.: US 6,834,189 B1
(45) Date of Patent: Dec. 21, 2004

(54) CELLULAR COMMUNICATION SYSTEM HANDOVER

(75) Inventor: Brian J. Forde, Dublin (IR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/501,896

(22) Filed: Feb. 10, 2000

(30) Foreign Application Priority Data

Feb. 26, 1999 (GB) .............................................. 9904349

(51) Int. Cl.$^7$ ................................................ H04Q 7/20
(52) U.S. Cl. ........................ 455/436; 455/445; 455/450
(58) Field of Search ................................ 455/436, 437, 455/438, 439, 442, 443, 445, 450

(56) References Cited

U.S. PATENT DOCUMENTS

| | | | |
|---|---|---|---|
| 5,640,679 A | | 6/1997 | Lundqvist et al. .......... 455/33.2 |
| 5,673,307 A | * | 9/1997 | Holland et al. ............. 455/436 |
| 5,862,130 A | * | 1/1999 | Tat et al. ..................... 455/550 |
| 5,864,759 A | * | 1/1999 | Tat .............................. 455/437 |
| 5,896,570 A | * | 4/1999 | Saunders et al. ........... 455/437 |
| 5,991,626 A | * | 11/1999 | Hinz et al. .................. 455/436 |
| 6,310,867 B1 | * | 10/2001 | Tat et al. ..................... 455/450 |

OTHER PUBLICATIONS

European Telecommunications Standards Institute: "Radio Equipment and Sstems (RES) ;Digital Enhanced Cordless Telecommunications (DECT); Common Interface (CI); Part 3 Medium Access Control (Max) layer; ETS 300 175-3 (Second Edition)", p. 155 paragraph 10.6 –page 178, paragraph 11.4.4.

* cited by examiner

*Primary Examiner*—Tony T. Nguyen
(74) *Attorney, Agent, or Firm*—Jack D. Slobod

(57) ABSTRACT

A portable terminal of a cellular communication system is provided with apparatus for initiating a handover procedure to handover a connection established with one radio termination of a fixed system to another radio termination of the fixed system. The apparatus continually monitors system communication channels for transmissions by the radio terminations received at the portable terminal and identifies the nearest radio termination to be the one from which signals are received with the highest radio signal strength. If a connection is initially established by the mobile terminal with a first radio termination, but the mobile terminal subsequently moves away from that radio termination, the apparatus initiates a handover attempt of the connection to the radio termination from which transmissions are now received with the highest radio signal strength. Normally signals received with the highest signal strength will originate from the closest fixed radio termination. The initiation attempt is made on the basis that there is another radio termination present that will provide a higher radio signal strength even if the existing connection is determined to be of good quality and for which transmissions are being received with a signal strength that is classed as good or satisfactory. Such a pre-emptive handover can avoid the possible degradation in communication channel quality that can occur by the time a normal handover operation is completed.

19 Claims, 2 Drawing Sheets

CELLULAR COMMUNICATION SYSTEM HANDOVER

Figure 1:
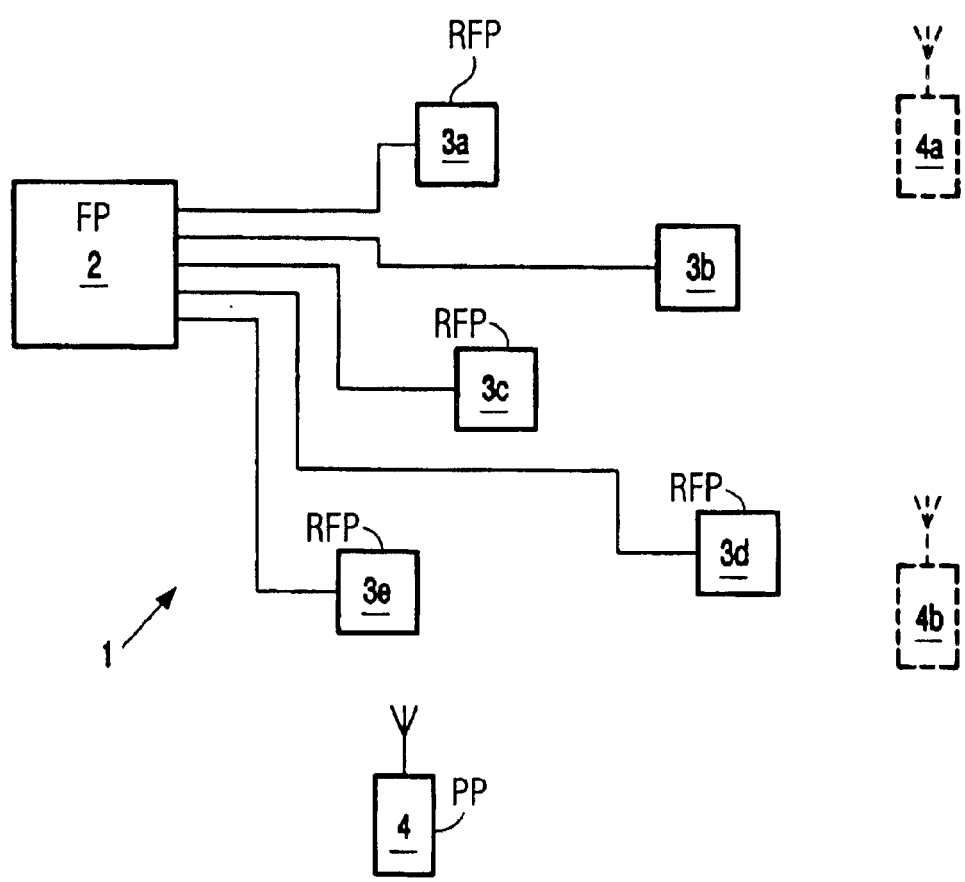

The present invention relates to cellular communication systems and in particular to intercell handover procedures employed in such systems.

In wireless radio communication systems it is important to maintain a good quality radio link between the mobile station and the fixed station if satisfactory communication is to be achieved. If the system is a cellular system, the fixed station will form part of a fixed communications system having a number of radio terminations. One requirement for maintaining a good quality link is that the mobile station should establish a radio link with the closest radio termination whenever possible. By using the shortest possible radio link distance, the radio signal strength detected at the mobile station arisu due to transmissions at a given power from the appropriate radio termination will be maximised. The same will be true for the radio signal strength detected at the radio termination due to transmissions of the mobile station. Higher detected radio signal strengths contribute to establishing a good radio communications link.

As a mobile station is moved around the radio coverage domain of the cellular communication system, the mobile station may move from one position in which it is closest to a first radio termination of the system, to another position in which it is closest to a second radio termination of the system. Since the mobile station should communicate with the fixed communication system over the shortest possible radio link distance wherever possible, any mobile station which is supporting a communication (such as a voice call) that moves as described will initially support the communication on a radio link with the first radio termination and subsequently switch to supporting the communication on a radio link with the second radio termination. Such a switching operation is known as a handover operation.

In a cellular system, the radio coverage area provided by one radio termination is often known as a cell. Handover operations can be from one cell to another cell and such a handover operation is called an intercell handover. Normally handover operations between cells will be between adjacent cells. Another type of handover exists called intracell handover where a communication supported on a first radio link with a radio termination is switched to being supported on a second radio link but with the same radio termination. This type of handover allows one radio link to be replaced by another radio link without changing the radio termination with which the mobile station is communicating.

In some types of wireless radio communications system such as certain cellular telephone communication systems it is the responsibility of the mobile station to maintain a good radio link with the fixed station. Where the communication system is a cellular communication system this will involve determining which radio termination the link should be established with. An example of one such system is a DECT compliant telecommunications system. (DECT is an abbreviation for Digital Enhanced Cordless Telecommunications and DECT systems are described in the standard ETS 300 175 of which there are several parts. The standard is published by the European Telecommunications Standards Institute and is incorporated herein by reference.)

In a DECT compliant telecommunications system the mobile station is called the portable part (PP) and the fixed station is called the fixed part (FP). The fixed part includes at least one radio fixed part (RFP) which is a radio termination, or radio end point, the latter two terms being used synonymously.

Taking a DECT compliant system as an example of a system where the mobile terminal assumes responsibility for maintaining link quality, and controlling handover operations, the portable part may monitor the signal strength of the radio link in use that is supporting a particular communication, such as a voice call, to determine if a handover operation should be performed to support the communication on a new radio link established with a different radio termination. (The different radio termination should be closer to the mobile terminal if the signal strength is higher.) In the DECT example the handover would be to another RFP. Monitoring of the radio link in use is normally conducted on an ongoing basis and when a degradation in signal strength is detected, handover to the nearest adjacent RFP is attempted.

A problem with the above type of operation is that the portable terminal, in this case the PP, waits until the signal strength degrades before an intercell handover operation is attempted. By the time the handover operation is complete, the signal strength of the radio link connection may have reduced to such an extent that the quality of the radio link is also affected and there is perceptible degradation in the quality of the supported communication channel. Where the connection carries traffic in the form of a voice-call, the degradation may be apparent to the user. Where the connection is carrying data, this may result in a reduction of bandwidth.

It is an object of the present invention to reduce the probability of a noticeable degradation in communication channel quality occurring during handover operations.

In accordance with one aspect of the present invention there is provided apparatus for initiating a handover procedure in a cellular communication system including a portable terminal and a fixed terminal having more than one radio end point, the radio end points being geographically spaced apart and provided for establishing wireless radio communication with the portable terminal over a wireless radio link, said apparatus including:

means for monitoring the radio signal strength received at the portable terminal due to transmissions of the radio end points, and initiating means for initiating a handover procedure to move a supported communication channel from being supported on a wireless link established with a first one radio end point to being supported on a wireless link established with a selected other one radio end point, the initiating means initiating the procedure to select the said other one radio end point immediately on determination by the monitoring means that the said other one radio end point provides a higher received signal strength than the currently selected radio end point.

Advantageously, because the said one other radio end point is selected as soon as it is determined that a higher radio signal strength is being received from it, the communication channel will be supported on a wireless link having the strongest signal strength for a greater proportion of time than would be the case for a communication system not benefiting from the present invention. The use of a wireless link having the strongest possible signal strength contributes towards providing a high quality communication channel.

In contrast with the operation of known communication systems, a communication system benefiting from the present invention will not wait for the radio signal strength of a selected wireless link to fall below a given threshold, before looking to use a wireless link having a higher signal strength. The present invention provides a mode of operation where handover attempts are made to pre-empt the onset of any degradation in the communication channel quality resulting from reduced radio signal strength of the radio link that is supporting the communication channel.

For such prior art systems it could occur to the skilled person that it may be possible to set the threshold level sufficiently high so that the system looks to use a new wireless link having a higher signal strength before the signal strength of the link in use falls enough to affect the quality of the communications link. However, it is a deterioration in signal strength which initiates the handover attempt and by the time a so initiated handover operation has been completed it is possible that a further deterioration has occurred which will cause a noticeable degradation in the communications channel quality, despite the fact the handover operation was initiated before the onset of such a degradation. In contrast, in the present invention handover operations are initiated on the basis that a radio link can be established with a higher signal strength than the radio link presently in use, not on the basis that the signal strength of the radio link presently in use is below a particular threshold.

In general the present invention will cause the portable terminal to maintain a wireless link with the closest radio end point and handover operations will normally be from one radio end point to a nearest adjacent radio end point.

The monitoring means can maintain information relating to the received radio signal strength in the form of values which may be stored in an array. In this case where the communications system employs predefined system communication channels, the values may be stored in positions in the array such that each position is assigned to a particular channel.

When the values are stored in an array having positions assigned to particular channels, there is no need to store channel identity information together with the radio signal strength information providing that the allocation of array positions to channels is known. The array is therefore an efficient way of storing information since it requires a comparatively small amount of storage capacity.

In accordance with another aspect of the present invention there is provided a method of initiating a handover procedure in a cellular communication system including a portable terminal and a fixed terminal having more than one radio end point, the radio end points being geographically spaced apart and provided for establishing wireless radio communication with the portable terminal over a wireless radio link, said method including the steps of monitoring the radio signal strength received at the portable terminal due to transmissions of the radio end points, and initiating a handover procedure to move a supported communication channel from being supported on a wireless link established with a first one radio end point to being supported on a wireless link established with a selected other one radio end point, the procedure being initiated to select the said other one radio end point immediately on determination that the said other one radio end point provides a higher received signal strength than the currently selected radio end point.

Other aspects and optional features of the present invention appear in the appended claims, to which reference should now be made and the disclosure of which is incorporated herein by reference.

Figure 2:
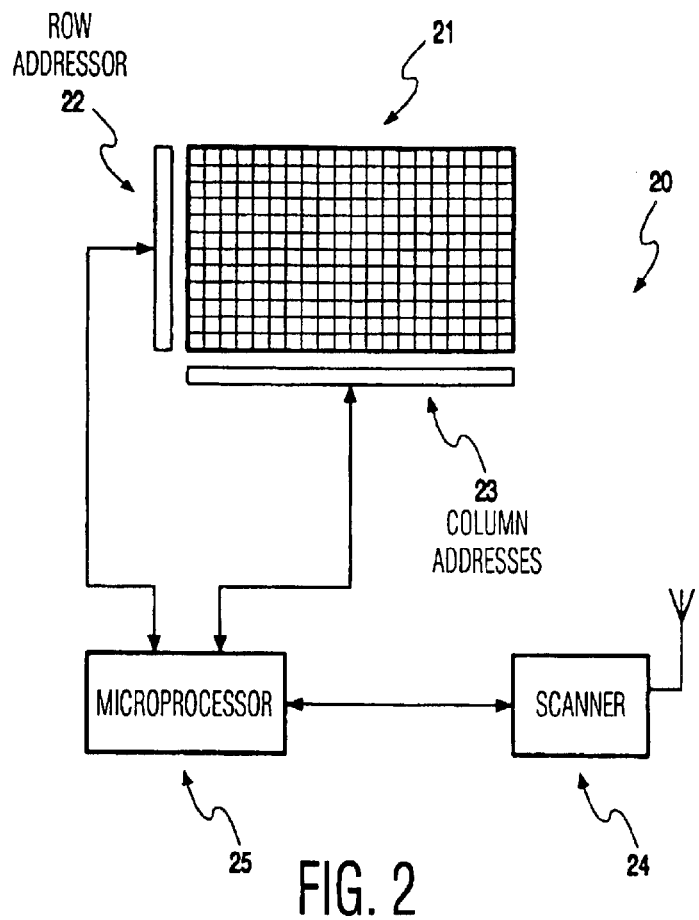
Figure 3:
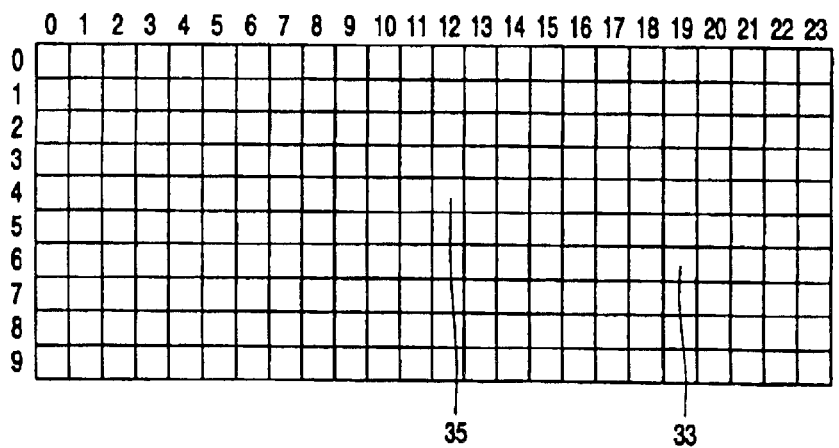

Embodiments of the present invention will now be described by way of example only, with reference to the accompanying drawings in which;

FIG. 1 shows the relative locations of selected components of a communication system which may host the present invention, FIG. 2 is a schematic representation of storage apparatus which may be used with the present invention, FIG. 3 shows a two dimensional array suitable for use as part of the storage apparatus.

FIG. 1 shows components of a cellular communications system in which each portable terminal is responsible for maintaining the quality of a radio link to the fixed part of the system and for controlling handover operations. The particular communications system shown is a DECT compliant communications system 1, having a fixed part in the form of a DECT fixed part (FP) 2 which includes a plurality of radio end points in the form of five radio fixed parts (RFP's), 3*a*, 3*b*, 3*c*, 3*d* and 3*e*. One portable terminal is shown which is a DECT compliant portable part PP4 and PP4 is capable of establishing communication with the fixed part by establishing a wireless link with a RFP 3*a*, 3*b*. . . . 3*e*. Although five RFP's are shown in this example system other numbers of RFP's may be employed. Similarly the operation of one PP4 will be discussed although the communications system will normally be capable of supporting communication with a number of such PP's 4. The fixed part may be connected to a PSTN or PABX, as required. Before the PP4 can participate in traffic communication with the fixed system it needs to attain a condition where it is synchronised with a RFP3 of the FP2. This is made possible in a DECT compliant system because each RFP3 maintains transmissions that carry information relating to the identity of the particular RFP3 and the FP2 it is connected with. Because each RFP3 is always transmitting such information a PP4 is able to receive on each DECT system channel in turn and to monitor for activity on those channels.

This transmitted information is called N-channel and Q-channel information as will be understood by the person skilled in the art. For the purpose of clarity it should be mentioned that the DECT N-channel and DECT Q-channel are logical channels and not DECT physical channels.

Communication between a radio fixed part and a portable part is provided by so called bearers which are established on one or more DECT physical channels (channel). Each channel is created by transmitting in one particular slot on one particular radio frequency (RF) carrier in successive time division multiple access (TDMA) frames.

Because it is the responsibility of the PP to detect the presence of any nearby RFP's, when a PP is activated it begins to listen on each DECT channel for N-channel and Q-channel information broadcast by the RFP's. If a given RFP is involved in supporting a traffic connection with a PP then this information is broadcast by itself on a so-called dummy bearer. If a given RFP is involved in supporting one or more traffic connection with one or more PP's, the RFP broadcasts this information on each traffic bearer. A RFP supporting at least one traffic connection may drop the dummy bearer although the broadcast of the N-channel and Q-channel information on the dummy must be restored if all traffic connections with that RFP cease. In any case a RFP will always be transmitting N and Q-channel information on at least one DECT channel.

Another task of the PP is to identify the RFP transmissions that are received at the PP with the highest detected radio signal strength. The RFP producing these transmissions is also identified and is designated as the strongest RFP. The strongest RFP will normally be the RFP that is closest to the PP and wherever possible communications between the PP and FP will be via the strongest RFP.

The PP stores information relating to the received radio signal strength for each DECT channel. A preferred method of doing this is to use the apparatus 20 shown in FIG. 2 for maintaining a record of radio signal strength for a plurality of system channels. The apparatus 20 includes a two dimensional storage array 21 for storing the measured signal strength, row addressing means 22, column addressing means 23, channel scanning means 24 and microprocessor 25. The microprocessor serves to control the scanning 24 and storage 21, 22, 23 means although the apparatus may be designed to function without a dedicated microprocessor and the respective functions thereof handled by other processor capability within the PP as will be apparent to the person skilled in the art. The two dimensional array is represented in more detail in FIG. 3 with each row of the array being assigned to correspond to a DECT frequency and each column of the array being assigned to correspond to a DECT time slot.

The portable part 4 scans each DECT channel using the channel scanning means 24 to measure the radio signal strength of each channel as detected at the portable part 4. A DECT physical channel (DECT channel) is defined in terms of a DECT frequency channel and a DECT time slot. A value relating to the detected signal strength is entered into the array in a particular location which is assigned for each physical channel until a value has been entered for each DECT channel. Because the value for each channel is stored in a respectively assigned location there is no need to store additional information relating to the identity of the DECT channel (this information can be derived from the storage location in the array).

Consider the situation where the portable part 4 is attempting to synchronise to a particular FP or class of FP. The PP4 attempts to do this via a RFP of that FP which will also give the best possible radio signal communication. In terms of the general arrangement of FIG. 1, it will be assumed that the required RFP is RFP3*e*. The PP scans each DECT channel in turn to determine the received radio signal strength of each channel and enter a value in the appropriate location of the array 21. If, for example, RFP3*e* is transmitting on the DECT channel occupying slot number 19 of DECT frequency number 6, a value representing the received radio signal strength for this DECT channel is entered into location 33 of the array. Similarly if RFP 3*d* is transmitting on the DECT channel occupying slot number 12 of DECT frequency channel number 4, a value representing the received radio signal strength for this DECT channel is entered into location 35 of the array 21. RFP's 3*a*, 3*b*. . . . 3*e* will also be transmitting at least N and Q channel information on a DECT channel and the resulting received radio signal strengths for those transmissions will also be represented by values entered in the appropriate locations of the array.

In operation DECT transmissions may be detected by PP4 on others of the DECT channels than the ones chosen for the present example. Indeed the detected radio signal strengths on many channels may correspond to background noise. Radio signal strength may be detected on a channel due to transmissions of a non DECT system or even just noise. On some channels the value detected may not be above the noise floor.

Once a value representing the received radio signal strength has been entered into the appropriate location of the array for each DECT channel the PP can now begin to detect the RFP that will provide the highest radio signal strength for communication and that is connected to a FP with which the PP wishes to communicate. The PP begins by scanning the array to find a value relating to the highest received radio signal strength. The associated channel can be derived from the position in the array and the PP attempts to set up a synchronisation (receive only) bearer on that channel (allowing the PP to read any Q and N channel information) to determine if the required RFP is indeed transmitting on that DECT channel. If it is established that this is not the case, the synchronisation bearer is released and the PP scans the array to find a value relating to the next highest received radio signal strength. The PP attempts to set up a synchronisation bearer on the channel associated with this value and the process is repeated for channels having progressively lower detected radio signal strengths until the nearest RFP is found that is part of the required FP or class of FP. The PP may perform further procedures to attain a state where it is in a condition ready to make or receive calls to the fixed part of the system through setting up traffic bearers. It may be desirable to set a condition so that only values representing radio signal strengths above a certain radio signal strength are chosen during scanning.

When the PP requires one or more DECT channels for setting up a traffic bearer the array is scanned for values representing the lowest detected radio signal strengths. The low detected radio signal strengths indicate that these channels are free for use as traffic bearers. The channel associated with these values may be determined from the position of the value in the array. A condition may be set such that only values corresponding to detected radio signal strengths below a certain threshold are selected. Alternatively, the lowest N values may be chosen, where N is a predetermined number.

Once the PP is synchronised to a RFP, if at any time the RFP indicates that certain slots are blind, then the PP can ignore those slots in the array when selecting a quiet channel. Furthermore, once the PP is indeed synchronised to a particular FP, and has chosen a particular RFP as the strongest (closest), the PP continues to periodically scan each DECT channel to detect the received radio signal strengths of each channel and update the value stored in the array. This is particularly important where the PP is mobile in which case it can move closer to and away from various other RFP's which will affect the detected radio signal strength at the PP. Depending on the updated values, the PP may synchronise with a different RFP, determine that a different RFP is stronger (closer) and synchronise with that different PP instead (using the N-channel and Q-channel information that is broadcast).

While the present example assigns array rows in order with the individual DECT frequency channel number and array columns with individual time slots this is not a requirement of the present invention. The array does not need to be a two dimensional array and other arrangements of one dimensional or three dimensional storage arrays could be employed. Indeed, an array does not need to be used for storing information and lists of channels having high and low received radio signal strengths could be used. Entries in the lists could be ordered by received signal strength.

Now assume that PP4 is in the location indicated as 4*a* in FIG. 1 and is supporting a voice communication channel on a traffic bearer set up with RFP 3*b*. (PP4*a* has previously identified RFP3*b* as being the strongest RFP with which the PP wishes to communicate). If PP4 now moves from position 4*a* to position 4*b* the radio signal of transmissions from RFP3*b* as received at PP4*b* will not be as high as the radio signal strength of transmissions from RFP3*d* as received at PP4*b*. This will be indicated by the values stored, in this example by array 21, because the array is periodically updated with values representing the received radio signal strength on each DECT channel. The PP attempts to set up a synchronisation bearer on the channels having a new highest received radio signal strength to read the N and Q channel information. This is done to determine the identity of any RFP responsible for transmissions on this channel. If it is found that the transmissions are from another RFP with which the PP could also communicate, this means that the PP is not communicating with the strongest RFP, which is the case here. If this is true the PP initiates the handover operation to move the communications channel to a bearer established with the new, strongest RFP. In the present example, a communication supported by a traffic bearer established between PP4 at position 4b with RFP3b would be moved to be supported on a traffic bearer established between PP4 and RFP3d. The new traffic bearer is set up on a DECT channel that is known to be quiet.

The handover operation occurs even if the received radio signal strength of bearers established with RFP3b is sufficiently high as to permit satisfactory operation in terms of communication channel quality. Such handover operations can pre-empt the occurrence of communication channel degradation as has already been discussed.

In above described example the values stored in the array are updated periodically. Once the value for each channel has been updated the values of the array are re-examined to establish which channels are represented as having the highest signal strength. Synchronisation bearers may then be set up on those channels to read the N-channel and Q-channel information. The above described procedures for identifying and synchronising with the strongest RFP may then be performed as appropriate. If a new RFP is found to be suitable and a traffic bearer is already in use, handover may be initiated. Handover mechanisms are well defined in the DECT standard.

The apparatus of the present invention may be implemented in the form of hardware, software or a combination thereof. As such, certain components of the claims, for example the monitoring means and the initiating means, are not explicitly illustrated as distinct components in the figures of the drawings. The apparatus of the present invention may be combined at least in part with other communication apparatus components. However, in one arrangement the apparatus is embodied using the microprocessor 25 which may further employ the channel scanning means 24 and array 21.

As mentioned it is not essential that an array is used. Furthermore the periodicity of updating the values is normally chosen to give satisfactory performance while not giving rise to excessive power consumption. In principle the values stored in the operation could be updated as a result of continually monitoring radio signal strength but this would generally increase power consumption.

The handover operation of the present invention may operate in conjunction with other handover criteria. For example a bearer may not be set up on a DECT channel to a particular RFP if the quality of that channel is poor, as may occur if there is interference on that channel. This may be the case even where the available radio signal strength on that channel with the particular RFP is high. One way of determining the quality of a channel is the subject of co-pending U.S. patent application entitled "Communication Channel Quality Indicator" which claims priority from UK patent application number GB 9904351.5 and which is incorporated herein by reference. Indeed the use of an array for storing information relating to received radio signal strength on a plurality of communication system channels is the subject of co-pending U.S. patent application entitled 'Wireless Communications Channel Management' which claims priority from UK patent application number GB9904348.1 which is also incorporated herein by reference.

From reading the present disclosure other modifications will be apparent to the person skilled in the art. Such modifications may involve other features which are already known in the design, manufacture and use of systems and devices and component parts thereof and which may be used instead of or in addition to features already described herein.

What is claimed is:

1. An apparatus for initiating a handover procedure in a cellular communication system including a portable terminal and a fixed terminal having more than one radio end point, the radio end points being geographically spaced apart and provided for establishing wireless radio communication with the portable terminal over a wireless radio link, said apparatus including monitoring means for monitoring the radio signal strength received at the portable terminal due to transmissions of the radio end points; and initiating means for initiating a handover procedure to move a supported communication channel from being supported on a wireless link established with a first one radio end point to being supported on a wireless link established with a selected other one radio end point, the initiating means initiating the procedure to select the other one radio end point immediately on determination by the monitoring means that the other one radio end point provides a higher received signal strength than the currently selected radio end point.

2. The apparatus in accordance with claim 1, wherein said monitoring means maintains signal strength information in the form of values which are stored in an array.

3. The apparatus in accordance with claim 2, wherein the communication system employs predefined system communication channels and the values are stored in positions in the array such that each position is assigned to a particular channel.

4. The apparatus in accordance with claim 3, wherein the portable terminal is a DECT compliant portable part.

5. The apparatus in accordance with claim 2, wherein the portable terminal is a DECT compliant portable part.

6. The apparatus in accordance with claim 1, wherein the communication system is a DECT compliant communication system, the portable terminal is a DECT compliant portable part, the fixed terminal is a DECT compliant fixed part, and each radio end point is of a DECT compliant radio fixed part.

7. The apparatus in accordance with claim 1, wherein the portable terminal is a DECT compliant portable part.

8. The apparatus in accordance with claim 1, wherein the communication channel is a DECT bearer.

9. The apparatus of claim 1, further comprising:

means for deciding whether to complete or terminate the move of the supported communication channel from being supported on the first wireless link established with the first one radio end point to being supported on the wireless link established with the selected other radio end point based on a quality of the wireless link established with the selected other radio end point.

10. A method for initiating a handover procedure in a cellular communication system including a portable terminal and a fixed terminal having more than one radio end point, the radio and points being geographically spaced apart and provided for establishing wireless radio communication with the portable terminal over a wireless link, said method including the steps of:

monitoring the radio signal strength received at the portable terminal due to transmissions of the radio end points, and initiating a handover procedure to move a supported communication channel from a wireless link established with a first one radio end point to a wireless link established with a selected other one radio end point, the procedure being initiated to select the said other one end point immediately on determination that the said other one radio end point provides a higher received signal strength than the currently selected radio end point.

11. The method of claim 10, further comprising:

deciding whether to complete or terminate the move of the supported communication channel from being supported on the first wireless link established with the first one radio end point to being supported on the wireless link established with the selected other radio end point based on a quality of the wireless link established with the selected other radio end point.

12. In a cellular communication system including a portable terminal and a fixed terminal having more than one radio end point, the radio end points being geographically spaced apart and provided for establishing wireless radio communication with the portable terminal over a wireless radio link, said portable terminal including:

monitoring means for continually monitoring a radio signal strength of each radio end point, and initiating means for initiating a handover procedure to move a supported communication channel from being supported on a wireless link established with a first one radio end point to being supported on a wireless link established with a second one radio end point in response to said second radio end point having a higher received signal strength than said first radio end point.

13. The portable terminal of claim 12, further comprising:

means for deciding whether to complete or terminate the move of the supported communication channel from being supported on the first wireless link established with the first one radio end point to being supported on the wireless link established with the second one radio end point based on a quality of the wireless link established with the second one, radio end point.

14. In a cellular communication system including a portable terminal and a fixed terminal having more than one radio end point, the radio and points being geographically spiced apart and provided for establishing wireless radio communication with the portable terminal over a wireless radio link, a method of operating the portable terminal including continually monitoring a radio signal strength of each radio end point; and initiating a handover procedure to move a supported communication channel from being supported on a first wireless link established with a first one radio and point to being supported on a wireless link established with a second one radio end point in response to the second radio end point having a higher radio signal strength than the first radio end point.

15. The method of claim 14, further comprising:

deciding whether to complete or terminate the move of the supported communication channel from being supported on the first wireless link established with the first one radio end point to being supported on the wireless link established with the second one radio end point based on a quality of the wireless link established with the second one radio end point.

16. In a cellular communication system including a portable terminal and a fixed terminal having more than one radio end point, the radio end points being geographically spaced apart and provided for establishing wireless radio communication with the portable terminal over a wireless radio link, said portable terminal including:

monitoring means for monitoring a radio signal strength of each radio end point;

initiating means for initiating a handover procedure to move a supported communication channel from being supported on a wireless link established with a first one radio end point to being supported on a wireless link established with a second one radio end point in response to said second radio end point having a higher received signal strength than said first radio end point and irrespective as to whether the handover procedure is warranted in view of the radio signal strength of said first radio end point.

17. The portable terminal of claim 16, further comprising:

means for deciding whether to complete or terminate the move of the supported communication channel from being supported on the first wireless link established with the first one radio end point to being supported on the wireless link established with the second one radio end point based on a quality of the wireless link established with the second one radio end point.

18. In a cellular communication system including a portable terminal and a fixed terminal having more than one radio end point, the radio end points being geographically spaced apart and provided for establishing wireless radio communication with the portable terminal over a wireless radio link, a method of operating the portable terminal including:

monitoring a radio signal strength of each radio end point, and initiating a handover procedure to move a supported communication channel from being supported on a first wireless link established with a first one radio end point to being supported on a wireless link established with a second one radio end point in response to the second radio end point having a higher radio signal strength than the first radio end point and irrespective as to whether the handover procedure is warranted in view of the radio signal strength of said first radio end point.

19. The method of claim 18, farther comprising:

deciding whether to complete or terminate the move of the supported communication channel from being supported on the first wireless link established with the first one radio end point to being supported on the wireless link established with the second one radio end point based on a quality of the wireless link established with the second one radio end point.

\* \* \* \* \*